Dec. 22, 1942.  R. F. HEALD  2,306,265
DEGASIFYING VISCOUS COMPOSITIONS
Filed April 17, 1941  2 Sheets-Sheet 1
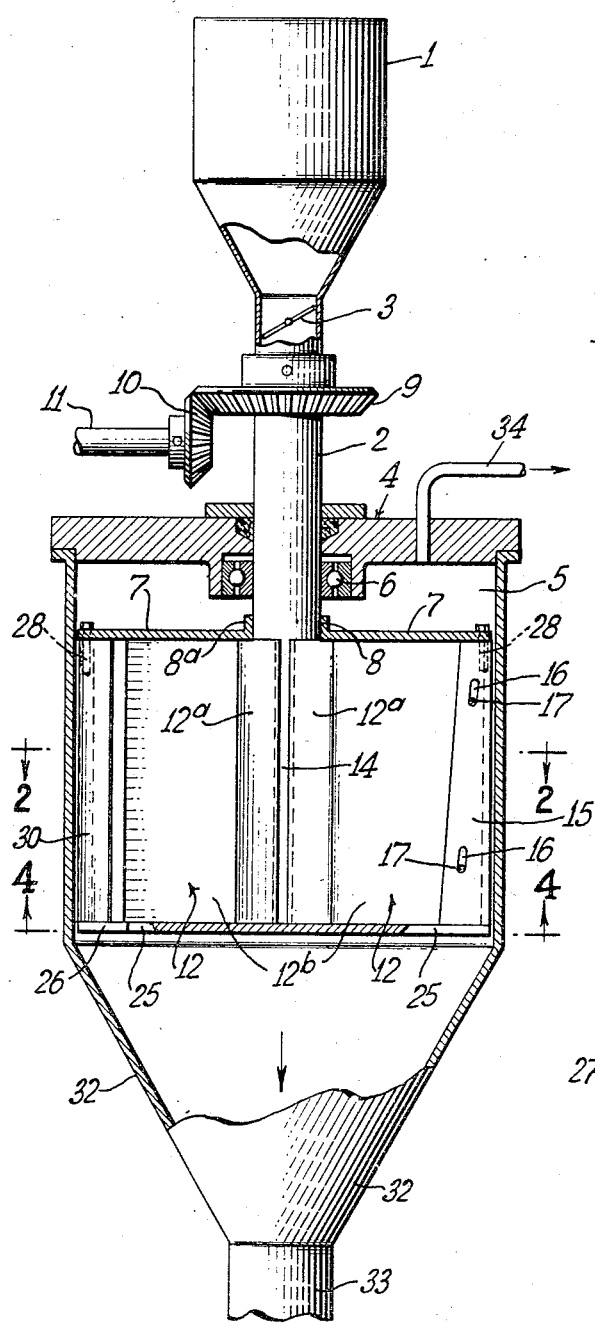
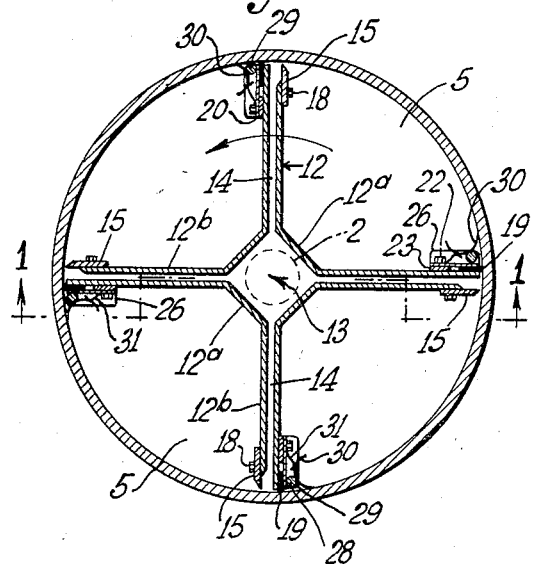
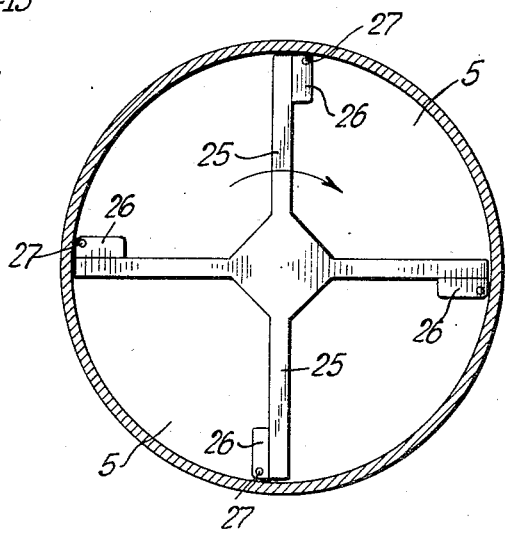
INVENTOR
Robert Franklin Heald
BY
Trenton Meredith
ATTORNEY Dec. 22, 1942.    R. F. HEALD    2,306,265
DEGASIFYING VISCOUS COMPOSITIONS
Filed April 17, 1941    2 Sheets-Sheet 2
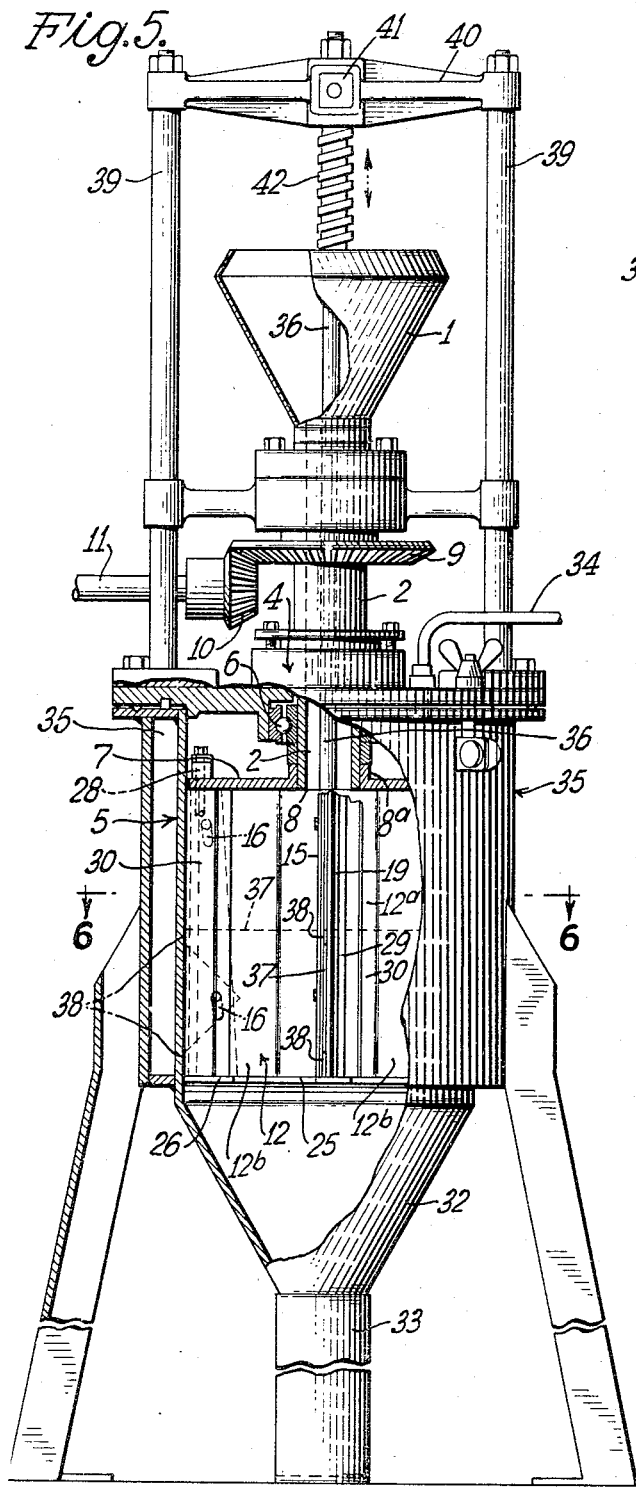
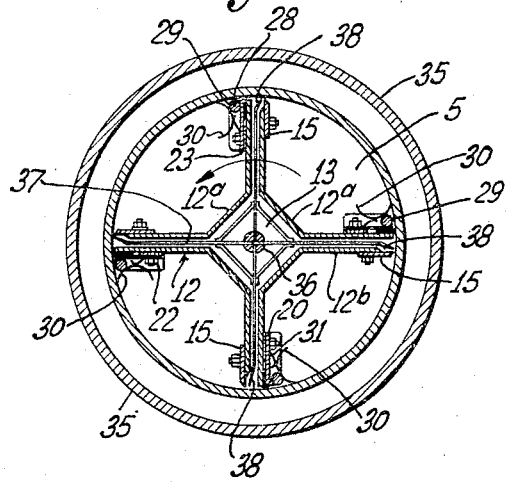
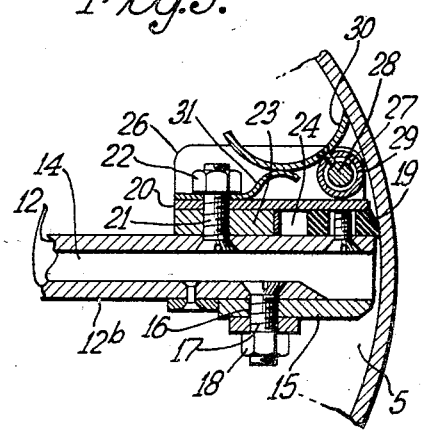
INVENTOR
Robert Franklin Heald
BY
*Grinison Meredith*
ATTORNEY Patented Dec. 22, 1942

2,306,265

UNITED STATES PATENT OFFICE 2,306,265

DEGASIFYING VISCOUS COMPOSITIONS

Robert Franklin Heald, Nutley, N. J., assignor to Colgate-Palmolive-Peet Company, Jersey City, N. J., a corporation of Delaware Application April 17, 1941, Serial No. 388,990

9 Claims. (Cl. 183—2.5)

The present invention relates to a process for degasifying viscous compositions and, more particularly, to a process for rapidly deaerating heavy dental creams and pastes.

Heretofore, great difficulty has been experienced with many heavy, viscous pastes and creams in that, during mixing operations necessary in their manufacture, especially where dry ingredients are added, a considerable volume of air is beaten into these compositions and remains therein in the form of bubbles in the final product. These air bubbles require that the processor furnish a larger container for a given weight of material and, moreover, the product is undesirable from a merchandising aspect. Thus, upon standing for a considerable period of time upon the shelves of dealers or upon the premises of the consumer, there is a tendency for these air bubbles slowly to collect in larger bubbles. For this reason, even though the proper weight is contained in the package, the appearance of the material when put into use is unsatisfactory. Even in those cases where the paste or cream is used promptly, so that the bubbles only partially coalesce, their presence throughout the composition gives it a coarse and unsatisfactory appearance.

The prior art has attempted to rid such compositions of the bubbles contained therein by various means. For example, a cream of this type is permitted to stand in bulk for a few days and is then stirred, on the theory that the small bubbles collect into bubbles of somewhat larger size and can then be released by the stirring operation. After stirring, the material is permitted to stand for a few days longer and is then stirred again. This operation is repeated three or four times within a period of a couple of weeks. It will be apparent that such a process has considerable disadvantages from a practical standpoint in large-scale operations, as storage facilities must be provided in the factory for the product of a couple of weeks' manufacture. Other proposals and suggestions have been made for solving this pressing problem of the prior art, but none of these suggestions and proposals, so far as I am aware, has been entirely satisfactory when employed in industrial operation upon a commercial scale.

I have found that this troublesome problem can be simply and inexpensively solved.

It is an object of my invention to provide a method for degasifying viscous compositions, which method is rapid and efficient in operation.

It is also an object of this invention to provide a method for removing bubbles from fluid compositions and plastic materials having a low but perceptible rate of flow at moderate temperatures, without substantial change in the composition.

My invention further contemplates the provision of a method for deaerating creams and pastes, especially dental creams and pastes, without appreciably lowering their moisture content.

Other objects and advantages of the present invention will be apparent to those skilled in the art from the following description, taken in conjunction with the accompanying drawings, in which:

Fig. 1 is a vertical cross-section of an embodiment of a device according to my invention, taken on line 1—1 of Fig. 2;

Fig. 2 depicts a horizontal section of the device, taken on line 2—2 of Fig. 1;

Fig. 3 illustrates on a larger scale a detail of the construction depicted in Fig. 2;

Fig. 4 shows a horizontal section of my device, taken on line 4—4 of Fig. 1, looking in the direction of the arrows;

Fig. 5 is another device suitable for use in accordance with my invention; and

Fig. 6 depicts a horizontal section, similar to Fig. 2, of the modification illustrated in Fig. 5.

Broadly stated, according to the present invention, I have found that viscous compositions containing gas bubbles can be degasified without appreciable change in composition by momentarily exposing a maximum surface of the material in the presence of a vacuum and then quickly returning the material to a body of minimum surface to prevent the evaporation of moisture and other volatile components. The exposure of a thin film of the composition to be degasified permits the gas to break through and to leave the material, and the quick collection of the composition does not give volatile liquid components sufficient opportunity to vaporize. Those skilled in the art will appreciate that various forms of equipment can easily be devised for carrying out this process and that various modifications thereof can be developed from this concept.

I prefer to accomplish this degasification by feeding the viscous composition into an evacuated cylinder, spreading the composition upon its walls, and immediately thereafter scraping the degasified material from the walls. While I have found that this entire process can be satisfactorily carried out at room temperature in the case of most of the materials handled, slightly higher temperatures are desirable in some instances. Thus, moderate temperatures, that is, those below the boiling point of water at the particular reduced pressure employed, can be suitably used, and I therefore prefer to furnish a jacket for the evacuated cylinder whereby the temperature of the walls can be controlled, if desired. It may also be desired, in the case of certain compositions, to furnish a cleaner blade for breaking up larger particles of the material which would have a tendency to clog the instruments employed for spreading material upon the walls.

My preferred process will now be described in connection with an apparatus for carrying the same into practice. Referring to Fig. 1, reference character 1 indicates a hopper adapted for holding a quantity of a material to be degasified. The lower end of the hopper communicates with a tube 2, and a valve 3 at the connection between the hopper and tube regulates the amount of material permitted to leave the hopper. The tube passes through a stuffing box 4 into a cylindrical chamber 5 and is journaled at the upper part thereof and kept in alignment by ball bearings 6. The lower part of the tube passes through a circular horizontal disc 7. This disc is of diameter slightly less than the inside diameter of the chamber 5 and is spaced from the walls thereof. It has a centrally located port 8, and the lower end of the tube 2 is flush with the bottom surface of the disc, being attached to said disc through an upwardly extending collar 8a surrounding the port. A beveled gear 9 is fixedly attached to the tube 2 above the stuffing box, and this gear engages with a second beveled gear 10 which is fastened upon a driving shaft 11.

Within the cylindrical chamber and below the circular disc 7, there are four vertical plates 12 attached to the rotatable tube 2 through the disc 7 and adapted to be rotated therewith. The vertical plates are three-sided, the sides of each plate meeting each other, respectively, at an angle of 135° (see also Fig. 2), the center sections 12a of the four plates forming a vertical rectangular central manifold 13 positioned in alignment with the circular tube 2. A side section 12b of each vertical plate is thus parallel to the opposite side section of the adjacent plate and is spaced apart from it to form a channel 14. The channels are closed off at the top thereof by the circular disc 7 which is attached to the upper ends of the vertical plates 12, and these plates are of sufficient width so that the channels extend almost to the cylinder walls.

Having reference to the direction of rotation of the tube 2 and of the vertical plates 12, the rearmost side section 12b of each pair of side sections forming the walls of a channel 14 has a spreader 15 attached thereto. The four spreaders are metal sheets of substantially the same length as the vertical plates to which they are attached and have a pair of slots 16 therein at a slight angle to the vertical plates, as shown in Fig. 1. Bolts 17 in each vertical plate 12 pass through these slots, and nuts 18 are adapted to hold the spreader in contact with the side section 12b of the vertical plate. The angulation of the slots permits the spreader to be moved nearer to or farther from the wall of the cylindrical chamber and thus enables the operator to regulate the thickness of a film spread upon the cylinder walls.

In contact with the forward side section 12b of each vertical plate, still having reference to the direction of rotation, there is a frictional element 19, preferably made of fibre board or similar material. Screws passing through the vertical plates and into holes in the frictional elements maintain said elements in relatively fixed position along the plates, although the holes in said elements are of sufficient size to permit a certain degree of movement. These elements are kept in contact with the side sections by means of clamp plates 20 which are held in position by bolts 21 passing through the vertical plates 12 and the clamp plates and are fastened by nuts 22. Shims 23 are employed for spacing the clamp plates from the vertical plates 12, and said shims are of approximately the same thickness as the frictional elements 19. Between each shim and the corresponding frictional element, there is a flat spring 24 adapted to urge the element against the wall of the cylindrical chamber, thereby forming a seal.

The central manifold 13 and the four channels 14 are closed off at the bottom by a bottom plate 25 of special shape designed to close off only these openings and to leave the greater cross-section area of the chamber unobstructed at this point (see Fig. 4). This bottom plate has extension pieces 26 thereon projecting in front of the forward side section 12b of the vertical plates 12. A port 27 in each of these four extensions is in substantially vertical alignment with similar ports in horizontal disc 7, and a rod 28 passes through each pair of ports and is fastened top and bottom in fixed position. Around each rod, for the entire length of the vertical plates, there is a cylindrical support 29 having an inside diameter somewhat larger than the diameter of the rod. A scraper 30 adapted to make scraping contact with the walls of the cylinder is fixedly attached to each cylindrical support 29, as seen in the detailed illustration in Fig. 3. A leaf spring 31 held by the nut 22 to the clamp plate 20 is adapted to make contact with each scraper 30 and to urge said scraper against the wall of the cylindrical chamber.

Below the vertical plates 12 and the bottom plate 25, the cylindrical chamber is reduced in size to form a lower conical portion 32. This portion is connected at the bottom thereof with a receiver by means of an outlet tube 33 and an exhauster pump. I prefer to furnish an exhaust pipe 34 communicating with the top of the cylindrical chamber for maintaining a vacuum over the entire system.

Another device suitable for the operation of my improved process is illustrated at Fig. 5. In this modification, I have furnished a jacket 35 surrounding the cylindrical chamber 5, said jacket having appropriate connections for passing a fluid therethrough at any temperature desired. Means for breaking up any lumps or coarse particles which would be apt to clog the channels and spreader in some of the compositions processed are included in this modification. Such means comprise a vertical center rod 36 which passes downwardly through the hopper 1, the rotatable tube 2 and the central manifold 13. Radially disposed cleaner blades 37 are attached to this rod, one blade extending through each of the channels 14 formed by the adjacent sides of the vertical plates 12 (see Fig. 6). These blades are furnished with knife-like edges 38 which extend almost to the wall of the cylindrical chamber, being spaced therefrom by a distance shorter than would ordinarily be employed between the spreader and the chamber wall. Means are also employed for raising and lowering the cleaner blades within the cylindrical chamber, so that the edges 38 pass over the entire wall surface during the operation of my device. A suitable means for accomplishing this vertical movement of the cleaner blades is shown at Fig. 5 and comprises a pair of uprights 39 extending above the top of the hopper at opposite sides thereof. A cross bar 40 joins the uprights at the top, and at a point above the center of the hopper there is a ratchet arrangement 41 through which the upper part of the center rod 36 is adapted to pass. This upper portion of the center rod is furnished with a worm 42, and the rod is adapted to turn with the rotation of the tube 2. The worm and the ratchet are so engaged that the rotation of the center rod raises it through the cross bar, thus raising the cleaner blades, until all of the worm has passed upwardly through the ratchet, at which time the ratchet arrangement causes the continued rotation of the center rod to lower the worm and rod, and hence the cleaner blades. When all of the worm has passed downwardly through the ratchet, the travel is again similarly reversed.

It will be observed that the operation of my device is extremely simple. The composition to be degasified is continuously pumped into the hopper 1 and passes by gravity feed and suction through the rotating tube 2 into the central manifold 13. The composition is urged radially outward through the channels 14 and, emerging therefrom, is spread in a thin film upon the inside wall of the cylindrical chamber 5 by the spreader 15. The frictional element 19 is contact with the wall of the chamber prevents the composition from being forced forward upon emergence from the channel.

As the tube rotates, turning with it the vertical plates 12, it is the rear most side section of each pair of adjacent side sections of these vertical plates which carries the spreader. For this reason, the film of composition is permitted to remain upon the walls of the cylindrical chamber until, in the course of rotation, the forward side section of the next pair of adjacent side sections of the vertical plates passes over the same spot. During operation, a vacuum is held in the cylindrical chamber, so that the composition spread upon the walls thereof is subjected as a thin sheet or film to subatmospheric pressure. Consequently, even in the short interval between the passage of two successive pairs of side sections 12b over a portion of the wall, the gas bubbles in the composition expand under the greatly reduced pressure, break through the thin film and are exhausted.

The thickness of the sheet or film of material to be degasified is regulated as aforesaid by moving the spreaders 15 nearer to or farther from the chamber walls. Due regard is had for the consistency and viscosity of said material when making such regulation, as it is desired to apply the material to the walls in such manner that slippage down the surface thereof is avoided. In normal operation with creams and pastes of the consistency, say, of dental creams, a film of the order of about 0.005 to about 0.010 inch and even less is suitable.

In establishing an atmosphere at reduced pressure within the cylindrical chamber of my device, I have found that with the viscous creams and pastes intended to be deaerated a vacuum of at least about 26 inches of mercury is desirable and that it is preferable to employ a vacuum of about 28 to about 29 inches. If the device is employed for the degasification of more fluid compositions, a lower vacuum than 26 inches may be suitably employed.

As the forward section of the next pair of side sections of the vertical plates 12 passes over the now degasified composition, the scraper, which has been described supra as attached to this forward section, removes the film from the wall, bulking and consolidating it into a compact mass. The rotational speed of the device is controlled to provide such removal when the material to be degasified has been spread upon the wall for a short time, say, of the order of about 0.5 to about 3.0 seconds and preferably about 1.0 second. In the device described, this is therefore the time interval permitted for each quarter-revolution. The material falls into the lower conical portion 32 of the chamber and passes therefrom through the outlet tube 33. This tube is preferably kept full for more efficient operation, and the material is continuously pumped therefrom into a receiver.

This apparatus can also be readily adapted for batch operation. The composition to be degasified is introduced into the hopper 1 as required, and the processed material substantially free of gas bubbles can be drawn through the outlet tube 33 directly into a sealed receiver below, upon which a vacuum is maintained. In batch operation, the material is preferably blown or pumped from the receiver at atmospheric pressure into another container at fairly frequent intervals, so that, even in its bulk form, it is not subjected for too long a period to the influence of the vacuum.

Those skilled in the art will recognize that my novel device can be made in any required size and that the number of vertical plates, the angle of their sides, and the number of channels will be varied, depending upon the size of the unit. It will also be apparent that the size and number of the channels are preferably correlated to the rate at which the moving parts turn. For example, using a unit having a cylindrical chamber about 8 inches in diameter with spreader blades about 10 to about 12 inches high, and an overall height for the device of about 3 feet, I have found that the provision of four channels, as described, and a rate of about 10 to about 12 revolutions per minute with a vacuum of about 28 to about 29 inches and moderate temperature gives satisfactory results in deaerating pastes and creams of about the consistency of dental creams and furnishes about 100 pounds of deaerated material per hour. It will be understood that large commercial units of about 2 to 3 feet in diameter and having more numerous channels could be adapted to furnish a considerable output, say, of the order of about 50,000 pounds of more per day.

A feature of my process is that viscous materials can be degasified without appreciable change in their composition. In operating with a dental cream containing a large proportion of air bubbles and having a specific gravity of about 0.9 to about 1.1, averaging about 1.0, the device described produces a deaerated cream having a specific gravity of about 1.35 to about 1.45, averaging about 1.4. This deaerated cream is of essentially the same composition as the original material produced, and there is only a negligible amount of moisture lost during the processing. It will be realized by those skilled in the art that this rapid, inexpensive and highly efficient method of degasifying such materials is a tremenduous improvement over anything heretofore known to the prior art.

The present invention has been described with reference to a particular embodiment, but I realize that equivalents of elements described by me can be used and that other variations and modifications of my invention can be employed, without departing from the principles thereof. The invention has also been described with particular reference to the deaeration of dental creams, but it will be recognized that it has equal applicability to various other materials, such as shoe pastes, glues, mucilages, edible creams, pastes and spreads, mayonnaise, tars and bitumens, coating materials, primers, lotions, bandolines, certain soaps, toilet creams, pomades, and other materials of such consistency wherein bubbles of air or other gases are held or entrapped. Such variations and modifications are believed to be within the scope of the present specification and within the purview of the appended claims.

I claim:

1. A process for degasifying normally viscous materials which comprises momentarily subjecting a thin sheet of a gas-containing viscous material to sub-atmospheric pressure while maintaining said material substantially stationary to liberate contained gases and to leave contained liquids substantially unvaporized.

2. A process for degasifying normally viscous compositions which comprises momentarily exposing a thin sheet of a gas-containing viscous composition to sub-atmospheric pressure while substantially stationary whereby slippage of the material is avoided, said momentary exposure being for a time sufficient to liberate gases contained therein and to leave contained liquids substantially unvaporized at the temperature employed, and removing said viscous composition in a compact mass.

3. A process for degasifying normally viscous compositions which comprises spreading a gas-containing viscous composition upon a surface, momentarily subjecting said thinly-spread composition while substantially stationary upon said surface to sub-atmospheric pressure to liberate contained gases and to leave contained liquids unvaporized, and consolidating said composition into a compact mass.

4. A process for degasifying normally viscous compositions which comprises thinly spreading a gas-containing viscous composition upon a surface maintained at a temperature insufficient to vaporize liquids contained in said viscous composition in a short time, momentarily subjecting said thinly-spread composition to sub-atmospheric pressure sufficiently low to liberate substantially all contained gases while leaving contained liquids substantially unvaporized, scraping said composition from said surface, and collecting said composition.

5. A continuous process for degasifying normally viscous compositions which comprises continuously spreading a gas-containing viscous composition upon a continuous surface, maintaining an atmosphere at reduced pressure in momentary contact with said thinly-spread composition while the composition remains substantially stationary upon said surface to liberate contained gases therefrom, and continuously removing said composition from said continuous surface before substantial vaporization of contained liquids.

6. A continuous process for degasifying normally viscous compositions which comprises continuously thinly spreading a gas-containing viscous composition upon a continuous surface, maintaining said surface and thinly-spread composition at a moderate temperature, subjecting said thinly-spread composition to a vacuum of at least about 26 inches of mercury to liberate substantially all gases contained therein, continuously removing said liberated gases, continuously scraping said viscous composition from said continuous surface after about 0.5 to about 3.0 seconds, continuously collecting said composition, and continuously removing said composition from exposure to the vacuum.

7. A process for deaerating normally viscous compositions which comprises thinly spreading a viscous composition containing bubbles of air upon a surface, momentarily subjecting said thinly-spread composition while substantially stationary upon said surface to sub-atmospheric pressure to liberate contained air bubbles and to leave contained liquids unvaporized, evacuating the liberated air, and consolidating said composition into a compact mass.

8. A continuous process for deaerating dental creams which comprises continuously thinly spreading dental creams containing air bubbles and moisture upon a continuous surface, maintaining said thinly-spread creams at a moderate temperature, exposing said thinly-spread dental creams to a vacuum of about 28 to about 29 inches of mercury for a period of about 1 second to liberate substantially all air bubbles contained therein and to leave substantially all moisture unvaporized, continuously removing said liberated air, continuously scraping said creams from said continuous surface after said exposure for said period, continuously collecting said dental creams, and continuously removing said creams from exposure to the vacuum.

9. A process for deaerating dental creams which comprises spreading dental cream in a thin film upon a surface which is maintained at a temperature substantially below the boiling point of the liquid in the dental cream at the pressure employed, subjecting the thin film of dental cream while substantially stationary upon said surface to a vacuum of at least about 26 inches of mercury, and removing the dental cream from the influence of the vacuum before a substantial portion of the liquid in the dental cream has been vaporized.

ROBERT FRANKLIN HEALD.